UNITED STATES PATENT OFFICE.

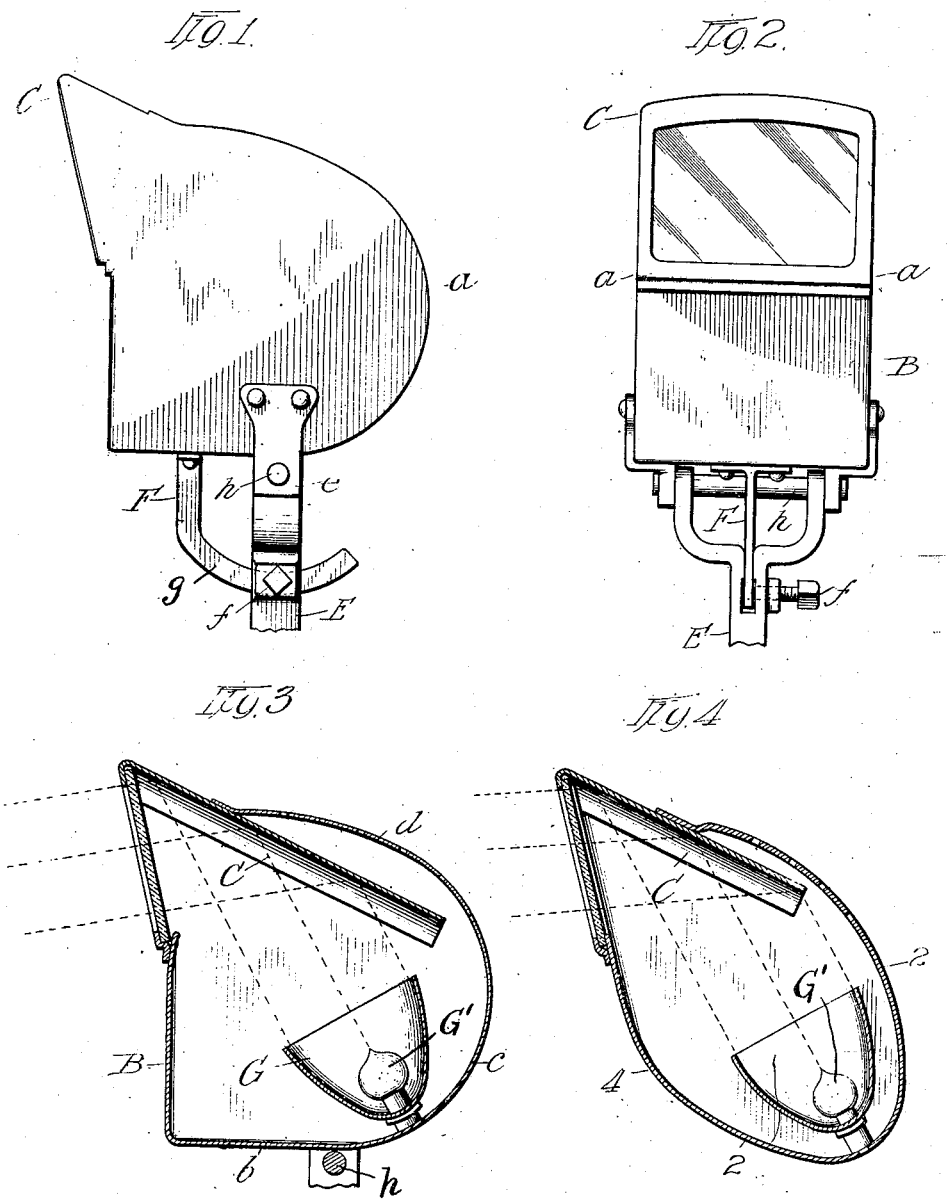

FRANK H. RUTHERFORD, OF CHICAGO, ILLINOIS.

HEADLIGHT FOR VEHICLES.

1,213,269.

Specification of Letters Patent.

Patented Jan. 23, 1917.

Application filed December 4, 1914. Serial No. 875,416.

*To all whom it may concern:*

Be it known that I, FRANK H. RUTHERFORD, a citizen of the United States, residing at Chicago, in the county of Cook and State of Illinois, have invented new and useful Improvements in Headlights for Vehicles, of which the following is a full, clear, and exact description.

My invention relates to head-lights for vehicles, and particularly automobiles and locomotives and other vehicles requiring at night illumination of the road in front of them.

Heretofore one-half of the rays of light from an ordinary automobile head-light were projected forward and scattered in every direction, and the other half projected rearward and struck the deflector by which latter they were deflected forward. Much of the illuminating efficacy of the lamp to light the road in front of the vehicle was, therefore, lost.

The object of my invention is to confine and concentrate the forwardly projecting rays as well as the rearwardly projecting rays of the light, and to direct them straight forward at a suitable downward angle, so that they will not only illumine the road, but being below the line of vision of those in front of the lamp will not blind them. This I accomplish by the means hereinafter fully described, and as particularly pointed out in the claims.

In the drawings: Figure 1 is a side elevation of my invention. Fig. 2 is a front view of the same. Fig. 3 is a longitudinal central section thereof. Fig. 4 is a longitudinal section of a modified form of my invention.

The casing of my improved head-light consists of vertical parallel metal side-walls a, a, which are connected by a suitable sheet metal strip, which latter is bent to form a flat bottom b, and a back c that extends from the rear edge of the bottom upward to and over the floor or bottom of the casing to form the top or roof d of the same. The upper edges of the side-walls extend forward beyond the transverse vertical plane of the front edges of the bottom and the roof of the casing, and a flat or slightly arched reflector C connects said side-walls, commencing at the forward ends of the top edges thereof and extending rearward and downward to and under the roof of the casing and terminates a short distance in front of the back of the casing. The front edge of the bottom of said casing is bent upward or it has a transverse vertical wall arising therefrom that constitutes a screen B, and back of this screen and, preferably, at the bend or angle at the juncture of the bottom and back of the casing, a suitable lamp G' is placed that has a reflector G back of it. I prefer to employ a parabola reflector and to so incline the same that both the direct rays of light and the reflected rays of light will be projected upward and forward against the reflector C. The latter will deflect the rays of light forward and downward from the lamp, substantially as shown in dotted lines, and will light up the roadway immediately in front of the head-light and will not blind and confuse those in front of it because the light will be below their line of vision. In this way the benefit of all of the rays of light generated in the lamp,—both those projected rearward and those projected forward will be obtained as said light-rays will be projected forward in proper position to strongly and fully illuminate the roadway.

When my improved lamp is used for a locomotive it will throw the light onto the track and collateral objects will not be subject to such bright light as to produce dark shadows, the movement of which, as the locomotive passes, are very bewildering and subject those desiring to cross the track to great danger because of their inability to gage the distance the approaching train is away from them.

As it may occasionally be desired to project the light forward a greater distance than it is wanted in cities, particularly when traveling on country roads, I have provided a suitable standard or support for the casing of the lamp by means of which it can be adjusted in any position desired to accomplish this result. This support comprises a standard E the upper end of which is, preferably, forked and provided with bearings in which a rock-shaft or spindle h is journaled, and angular lugs e, e, fastened to and projecting down from the floor of the bottom of the casing between which the forked upper end of the standard is interposed and pivotally mounted by fitting the oppositely projecting ends of the rock-shaft in openings in the depending portion of the lugs. Midway between these forks an arm F is secured to and projects downward and forward from the bottom of the casing, and at a suitable point below the plane of the spindle this arm is provided with a rearwardly extending segment g which passes through a suitable opening in standard E. When the casing is adjusted so as to project the light forward at the angles desired, a set-screw f is screwed against and clamps the segment g of arm F securely so as to maintain the casing and lamp in the position desired.

In Fig. 4, I show a modified form of my invention. In this modification, the back and bottom of the casing is made of a U-shaped metal strip 2, and the lamp 3 with its parabola reflector is seated in the bend of said U-shaped strip and projects its rays upward against a deflector which deflects the light downward. In this modification, the forward arm 4 of the U-shaped strip of sheet metal forming the bottom and back acts as a screen to hide the lamp and prevent the direct rays of light therefrom being seen in a direct line in front of the lamp.

I do not desire to be confined to the exact construction of my improved lamp, as shown and described, the essential features of which are a hidden lamp and an overhead reflector for deflecting the rays of said lamp forward. Any changes of construction that may be necessary to accomplish this result, I consider as coming within the scope of my invention.

What I claim as new is:

1. A device of the class described comprising a casing, a lamp inclosed in said casing, an upper reflector located in the upper portion of the casing and arranged to project the light forward from the upper portion of the same, and a lower parabola reflector inclosed within said casing which concentrates and throws the rays of light upwardly and forwardly against said upper reflector.

2. A device of the class described comprising a suitable casing, a lamp inclosed within said casing, an upper forwardly extending upwardly inclined reflector arranged to project the light forward from the upper part of said casing, and a lower parabola reflector within which said lamp is placed which is inclosed within the lower part of said casing and which throws the rays of light upwardly and forwardly against said upper reflector.

3. A device of the class described comprising a closed hollow casing having an upper opening in its front, an upper reflector extending rearwardly and downwardly through the top of said opening into said casing, a lower parabola reflector within the lower closed portion of said casing, and a lamp within said parabola reflector which latter reflects and concentrates the light upwardly and forwardly against said upper reflector.

4. A device of the class described comprising a hollow casing having an upper front opening for the passage of light rays, an upper reflector extending within the casing and rearwardly and downwardly from the top of said opening to near the rear of said casing, a lower parabola reflector within the lower portion of the casing and arranged to reflect light rays upwardly and forwardly upon the upper reflector, and a suitable lamp within and surrounded by the parabola reflector; said lamp and parabola reflector being concentric.

5. A device of the class described comprising a hollow casing having an upper front opening closed by a transparent window, and an opaque wall beneath said opening, an upper reflector extending within the casing and rearwardly and downwardly from the top of said opening, a lower parabola reflector located within the lower portion of the casing and concealed behind the opaque front wall thereof, and a suitable lamp within the parabola reflector, said lamp and parabola reflector being arranged to cast and reflect the light rays upwardly and forwardly upon the upper reflector.

6. A device of the class described comprising a casing having an upper front window, a reflector located in the upper portion of the casing in the rear of the window, a parabola reflector located in the lower portion of the casing, and a lamp surrounded by the parabola reflector; said lamp and parabola reflector being arranged to cast and reflect the rays of light upwardly and forwardly upon the reflector, and said reflector being arranged to receive and deflect the light rays outwardly through the front window in the casing.

In witness whereof I have hereunto set my hand this 25th day of November, 1914.

FRANK H. RUTHERFORD.

Witnesses:
FRANK D. THOMASON,
FLORENCE MITCHELL.